Feb. 17. 1925.
R. R. ROEMER
WHEELBARROW
Filed July 11, 1923     2 Sheets-Sheet 2
1,526,935
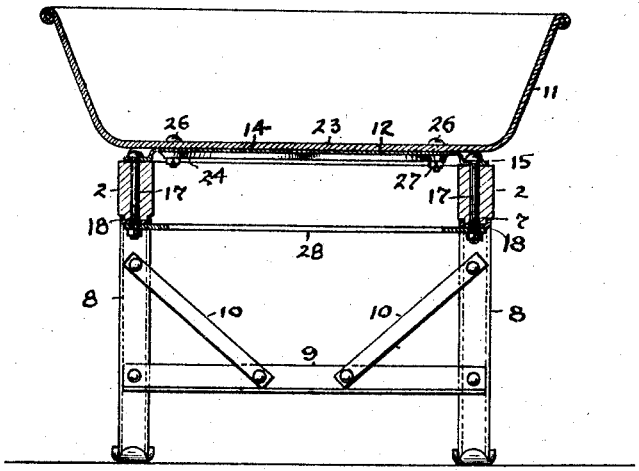
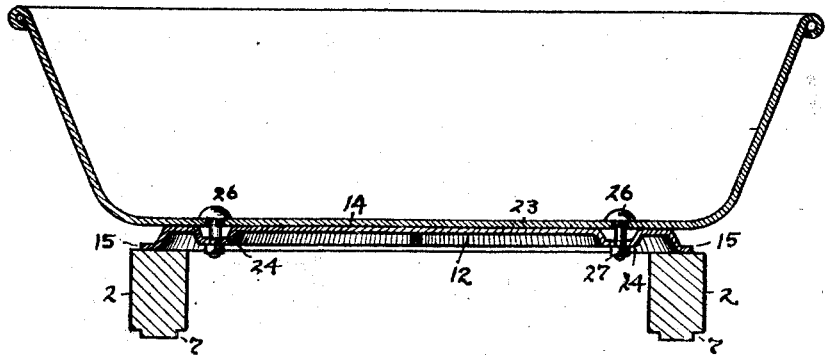
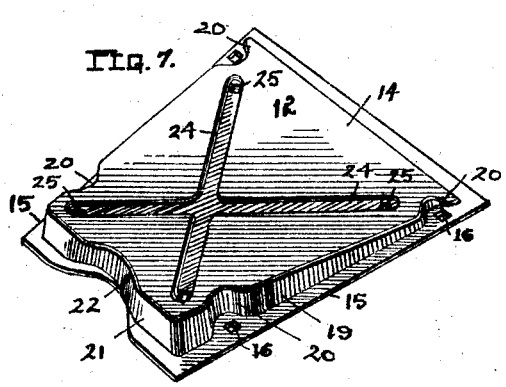
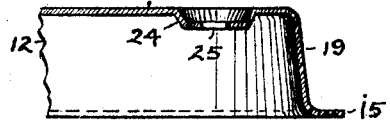
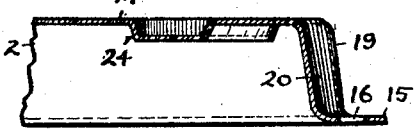
Inventor
R.R.ROEMER.
By Fisher, Moser & _____
Attorney Patented Feb. 17, 1925.

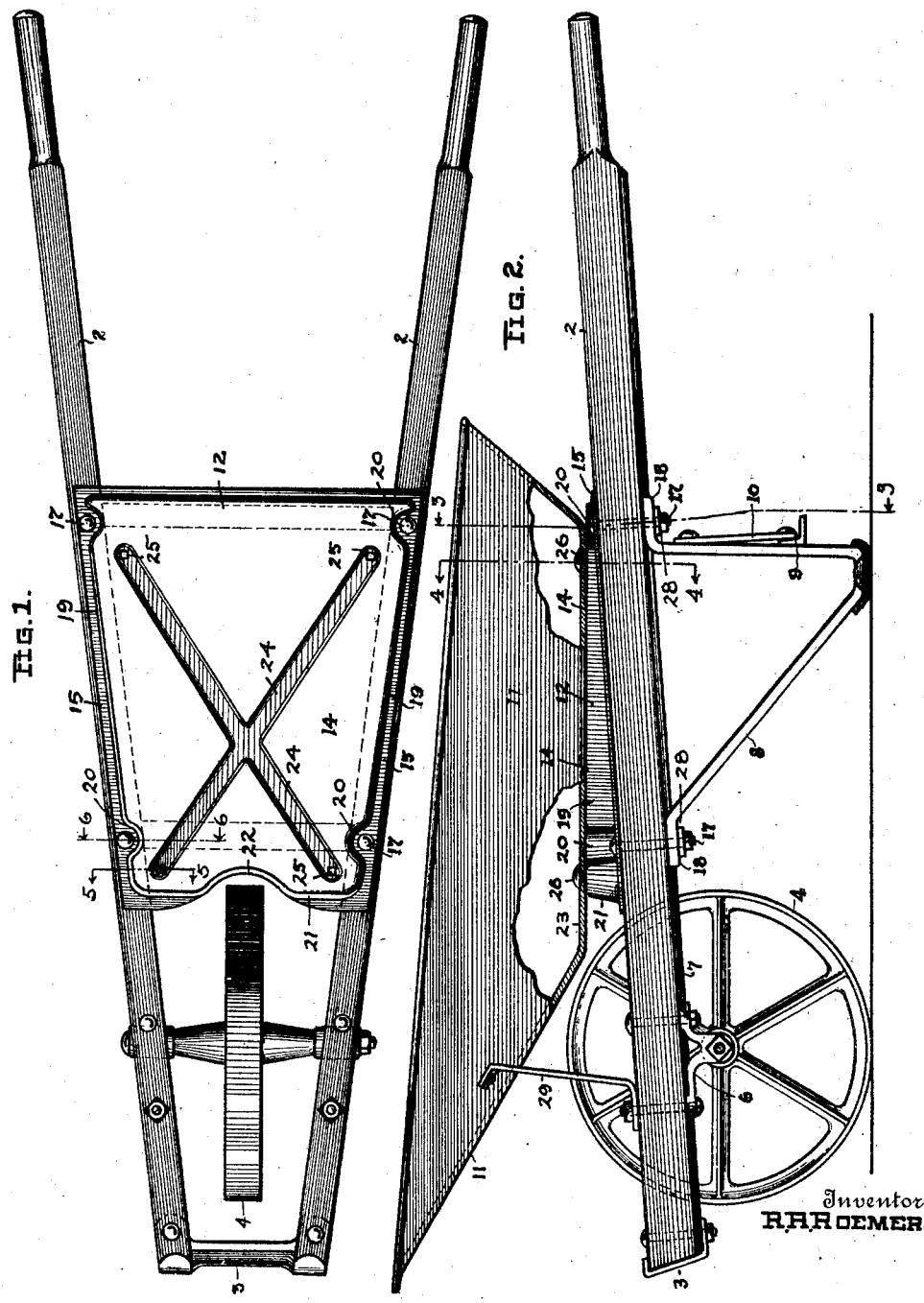

1,526,935

UNITED STATES PATENT OFFICE.

RALPH R. ROEMER, OF CLEVELAND, OHIO, ASSIGNOR TO THE CLEVELAND WHEELBARROW AND MANUFACTURING COMPANY, OF CLEVELAND, OHIO, A CORPORATION OF OHIO.

WHEELBARROW.

Application filed July 11, 1923. Serial No. 650,819.

*To all whom it may concern:*

Be it known that I, RALPH R. ROEMER, a citizen of the United States, residing at Cleveland, in the county of Cuyahoga and State of Ohio, have invented certain new and useful Improvements in a Wheelbarrow, of which the following is a specification.

My invention relates to an improvement in wheel barrows, and in general my object is to provide an exceptionally durable wheel-barrow which is particularly constructed to permit the parts thereof to be quickly and readily assembled, and in which a special plate is employed, first, to rigidly unite and brace the handles; second, to serve as a separate base or seat for the tray; and third, to permit the tray to be detachably secured in place without connecting or disconnecting any other parts. This base plate and tie member is preferably pressed from sheet metal and dished on sloping lines to provide a raised seat for the front end of the tray, and the plate is also corrugated in a way to effect a strongly braced bolted union for the tray. The plate is also shaped and formed with a view of permitting the tray to be mounted in an overhanging and relatively close position to the wheel so as to stabilize and balance the load, to afford a large capacity, and to avoid spilling of the load when the wheel-barrow is elevated at its handle end and trundled.

In the accompanying drawings, Fig. 1 is a top view of a wheel-barrow constructed according to my invention, but without the tray.

Fig. 2 is a side elevation of the wheelbarrow with the tray in place and partly in section.

Fig. 3 is a vertical section transversely of the wheel-barrow on line 3—3 of Fig. 2.

Fig. 4 is an enlarged cross section of the tray and its base-plate and the handles on line 4—4 of Fig. 2.

Fig. 5 is a sectional view of a corner portion of the base plate on line 5—5 of Fig. 1.

Fig. 6 is a cross section of the plate on line 6—6 of Fig. 1.

Fig. 7 is a perspective view of the complete base plate.

As delineated in the drawings the wheelbarrow comprises a pair of wooden handles 2—2 which in the main are rectangular in cross section and spread apart on converging lines and connected together at their front ends by a metal yoke or bracket 3. A wheel 4 is journaled within separate brackets 6 bolted to the ribbed bottom 7 of each handle 2, and a pair of angularly-bent channel irons 8 provide legs which are also bolted to the bottom face of the handles. Legs 8 are connected by an angle-iron cross piece 9 and braces 10. The structure so far described is not deemed new, and it is also an old expedient to mount and fasten a tray 11 upon the handles. But at this point I make a departure from customary practices and provide a special plate 12 which is pressed out of sheet-steel into the form of a trapezoidal figure and also dished on tapering or wedge-shaped lines longitudinally to provide a flat raised seat 14 higher at the front than at the rear end of the plate. In pressing the sheet into the desired form the opposite sides or border portions are flanged outwardly to provide a flat rim or flange 15 adapted to seat upon and fasten to the flat top surfaces of handles 2, and each flange or rim 15 has a pair of square bolt openings 16 therein, see Fig. 7, through which a carriage bolt 17 may be introduced, and the same bolts pass through the handles and the bent extremities 18 of the channel iron legs 8, see Figs. 2 and 3, thus securing the plates and legs jointly to the handles. To permit the raised seat portion of the plate to project over and the vertical wall 19 thereof to rest upon the handles, the rim or flange 15 is made relatively narrow, and the side wall 19 is also indented or formed with vertical side cavities or recesses 20 to receive the bolts and permit the heads thereof to be seated flush and solidly upon rim or flange 15. The front end and wall 21 of base plate 12 is also curved inwardly at 22 opposite the rim of wheel 4 to permit the plate to be brought a substantial distance forward upon the handles relatively to the wheel, and the plate is raised at its front end to permit the tray to extend over the wheel more or less, dependent upon the kind or shape of tray used. The front end of the tray at the base of the sloping bottom 23 is deeper than at the rear end and the tilt or inclination of the tray at its top is downwardly toward the rear end. When the tray is filled with a liquid or plastic substance which finds its own level the elevated front end of the tray has ample clearance to hold the material and prevent it from slopping over when the operator lifts the handle, at the rear.

The flat top 14 of plate 12 is also provided with corrugations or channeled ribs 24 stamped or pressed downwardly in the form of an X or cross, and bolt openings 25 are formed within the opposite ends of each leg of the cross closely adjacent to the inner vertical sides of handles 2 but sufficiently apart therefrom to permit short bolts 26 to be inserted through registering openings in the bottom of the tray and out of the bolt openings 25 in the corrugation or channeled ribs 24 where a nut 27 may be affixed and screwed tightly against the flat face of the corrugation or rib. In this way the tray is bolted detachably to the plate entirely independent of bolts 17 which fasten the plate to the handles, and the channeled ribs in the plate not only reenforce the plate as a whole, but also make a very rigid and strong place of union for each bolt 26. Although conveniently accessible at the inner sides of the handles, each nut 27 is confined and protected by the handles. In fastening the tray seating plate 12 to the handles, it is obvious that the handles are firmly united together, and rigidly braced by the plate at the top of the handles, and if further bracing is desired I may use additional cross straps 28 between the bolts 17 at the bottom of the handles, see Fig. 3. If desired, the overhanging front end of the tray may also be braced by iron straps 29, see Fig. 2.

What I regard as my invention and discovery and desire to claim, is:

1. A wheel-barrow, comprising a pair of handles, a trundle wheel and legs secured to said handles, an inverted dished plate having border flanges and a flat top inclined in respect to each other, means adapted to seat and secure said flanges to said handles, and a tray detachably affixed upon the flat top of said plate.

2. A wheel-barrow, comprising a pair of handles, a trundle wheel and legs secured to said handles, a dished plate of tapering wedge-shape seated in an inverted position upon said handles having a channeled and ribbed surface, bolts securing said plate to said handles, a tray seated upon said plate, and bolts securing said tray to said plate at the ribbed places therein.

3. A wheel-barrow, comprising a pair of diverging handles, a trundle wheel and legs secured to said handles, a dished sheet-metal plate of wedge-shape having lateral flanges provided with bolt holes and side walls provided with recesses opposite said bolt holes, bolts extending through said holes and handles, and a tray seated upon and secured to said plate.

4. A wheel-barrow, comprising a pair of diverging handles, a trundle wheel and legs bolted to said handles, a dished plate of sheet metal having perforated flanges seated upon said handles, the dished area of said plate having corrugated ribs provided with bolt openings a tray and fastening bolts therefor extending through the openings in said corrugated ribs.

5. A wheel-barrow, comprising a pair of diverging handles, a trundle wheel and a pair of legs affixed to said handles, a metal plate having a central raised sloping portion provided with diagonal corrugated ribs having bolt openings therein, means adapted to fasten plate to said handles, a tray having bolt openings adapted to register with the openings in said ribs, and bolts extending through said openings adapted to fasten the tray to said plate.

In testimony whereof I affix my signature this 16th day of June, 1923.

RALPH R. ROEMER.